United States Patent
Manber

(10) Patent No.: US 10,482,474 B1
(45) Date of Patent: Nov. 19, 2019

(54) ADVERTISING DATABASE SYSTEM AND METHOD

(75) Inventor: Udi Manber, Palo Alto, CA (US)

(73) Assignee: A9.Com, Inc., Palo Alto, CA (US)

( * ) Notice: Subject to any disclaimer, the term of this patent is extended or adjusted under 35 U.S.C. 154(b) by 3022 days.

(21) Appl. No.: 11/330,754

(22) Filed: Jan. 12, 2006

Related U.S. Application Data

(60) Provisional application No. 60/645,346, filed on Jan. 19, 2005.

(51) Int. Cl.
*G06Q 30/02* (2012.01)

(52) U.S. Cl.
CPC ......... *G06Q 30/02* (2013.01); *G06Q 30/0256* (2013.01)

(58) Field of Classification Search
CPC ............................ G06Q 30/02; G06Q 30/0256
USPC .......................................................... 705/14
See application file for complete search history.

(56) References Cited

U.S. PATENT DOCUMENTS

| | | | |
|---|---|---|---|
| 5,751,956 A | 5/1998 | Kirsch | |
| 5,918,014 A * | 6/1999 | Robinson | G06Q 30/02 706/12 |
| 5,948,061 A * | 9/1999 | Merriman et al. | 709/219 |
| 6,014,629 A * | 1/2000 | DeBruin-Ashton | G06Q 30/02 705/14.1 |
| 6,078,866 A | 6/2000 | Buck et al. | |
| 6,189,030 B1 | 2/2001 | Kirsch et al. | |
| 6,269,361 B1 | 7/2001 | Davis et al. | |
| 6,631,372 B1 | 10/2003 | Graham | |
| 6,778,975 B1 | 8/2004 | Anick et al. | |
| 6,826,572 B2 | 11/2004 | Colace et al. | |
| 6,839,681 B1 * | 1/2005 | Hotz | G06Q 30/02 705/14.41 |
| 6,876,997 B1 | 4/2005 | Rorex et al. | |
| 6,907,566 B1 | 6/2005 | McElfresh et al. | |
| 7,130,808 B1 * | 10/2006 | Ranka | G06Q 10/06315 705/14.43 |
| 7,552,458 B1 * | 6/2009 | Finseth | G06Q 30/0225 705/14.26 |
| 2001/0025274 A1 * | 9/2001 | Zehr | G06Q 10/107 705/402 |
| 2001/0047297 A1 * | 11/2001 | Wen | G06O 30/02 705/14.55 |
| 2001/0056465 A1 * | 12/2001 | Aiso | G06Q 10/107 709/203 |

(Continued)

OTHER PUBLICATIONS

"10 Products That oprah Made Popular", retireved on Nov. 10, 2014 at <<http://www.cnbc.com/id/43154653>>, 2 Pages.

(Continued)

Primary Examiner — John Van Bramer
Assistant Examiner — Darnell A Pouncil
(74) Attorney, Agent, or Firm — Lee & Hayes, P.C.

(57) ABSTRACT

An advertising database method and system provides an advertisement database service which is accessible to website publishers. Advertisement selection information may be received from a publisher of a website, and advertisements may be selected from an advertisement database in accordance with the selection information. The advertisement is provided to the website publisher for display on the website of the publisher. An endorsement of the advertisement by the publisher or by another user may be retrieved from the database and published with the advertisement.

22 Claims, 10 Drawing Sheets

(56) References Cited

U.S. PATENT DOCUMENTS

| | | | |
|---|---|---|---|
| 2002/0004735 A1 | 1/2002 | Gross | |
| 2002/0049635 A1* | 4/2002 | Mai | G06Q 30/0269 705/14.66 |
| 2002/0059102 A1* | 5/2002 | Sung | G06Q 30/02 705/14.49 |
| 2002/0087573 A1* | 7/2002 | Reuning | G06Q 10/06 |
| 2002/0147634 A1 | 10/2002 | Jacoby et al. | |
| 2003/0023481 A1* | 1/2003 | Calvert | G06Q 30/02 705/14.53 |
| 2003/0033292 A1 | 2/2003 | Meisel et al. | |
| 2003/0046159 A1 | 3/2003 | Ebrahimi et al. | |
| 2003/0050863 A1 | 3/2003 | Radwin | |
| 2003/0056213 A1 | 3/2003 | McFaddin et al. | |
| 2003/0101126 A1 | 5/2003 | Cheung et al. | |
| 2003/0149937 A1 | 8/2003 | McElfresh et al. | |
| 2003/0149938 A1 | 8/2003 | McElfresh et al. | |
| 2003/0217007 A1* | 11/2003 | Fukushima et al. | 705/51 |
| 2003/0220918 A1 | 11/2003 | Roy et al. | |
| 2003/0229542 A1 | 12/2003 | Morrisroe | |
| 2004/0015397 A1 | 1/2004 | Barry et al. | |
| 2004/0019523 A1 | 1/2004 | Barry et al. | |
| 2004/0039733 A1 | 2/2004 | Soulanille | |
| 2004/0044571 A1 | 3/2004 | Bronnimann et al. | |
| 2004/0044582 A1* | 3/2004 | Chowdhary | G06Q 10/083 705/26.1 |
| 2004/0103024 A1 | 5/2004 | Patel et al. | |
| 2004/0117259 A1 | 6/2004 | Morrisroe et al. | |
| 2004/0138946 A1* | 7/2004 | Stolze | G06F 17/30867 705/14.6 |
| 2004/0138956 A1 | 7/2004 | Main et al. | |
| 2004/0167845 A1 | 8/2004 | Corn et al. | |
| 2004/0186769 A1 | 9/2004 | Mangold et al. | |
| 2004/0204983 A1 | 10/2004 | Shen et al. | |
| 2004/0243581 A1* | 12/2004 | Weissman | G06F 17/30616 |
| 2004/0249709 A1 | 12/2004 | Donovan et al. | |
| 2004/0260689 A1 | 12/2004 | Colace et al. | |
| 2005/0004835 A1 | 1/2005 | Roslansky et al. | |
| 2005/0004837 A1* | 1/2005 | Sweeney | G06Q 30/02 705/14.16 |
| 2005/0021395 A1 | 1/2005 | Luu | |
| 2005/0027594 A1 | 2/2005 | Yasnovsky et al. | |
| 2005/0033771 A1* | 2/2005 | Schmitter | G06Q 30/02 |
| 2005/0049915 A1 | 3/2005 | Mehta et al. | |
| 2005/0055269 A1 | 3/2005 | Roetter et al. | |
| 2005/0065844 A1 | 3/2005 | Raj et al. | |
| 2005/0071218 A1 | 3/2005 | Lin et al. | |
| 2005/0071224 A1 | 3/2005 | Fikes et al. | |
| 2005/0096979 A1 | 5/2005 | Koningstein | |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0144073 A1 | 6/2005 | Morrisroe et al. | |
| 2005/0216335 A1 | 9/2005 | Fikes et al. | |
| 2005/0216457 A1* | 9/2005 | Walther | G06F 17/30696 |
| 2006/0004713 A1* | 1/2006 | Korte | G06F 17/30867 |
| 2006/0042483 A1* | 3/2006 | Work | G06Q 10/00 101/91 |
| 2006/0074749 A1* | 4/2006 | Kline | G06Q 30/02 705/14.48 |
| 2008/0082512 A1* | 4/2008 | Hogan | G06F 17/30864 |
| 2012/0095837 A1* | 4/2012 | Bharat | G06F 17/30867 705/14.54 |

OTHER PUBLICATIONS

"Krillion", Local Corporation, retrieved on Nov. 10, 2014 at <<http://about.krillion.com/>>, 2 pages.

"The Oprah Effect—How Oprah's Endorsement helps Companies", NBC Universal, Inc., Retrieved on Nov. 10, 2014 at <<http://www.accesshollywood.com/the-oprah-effect-how-oprahs-endorsement-helps-companies_article_18508>>, 7 pages.

* cited by examiner

Advertising Service — 110

Ad Data — 112

| Advertiser ID (202) | Advertisement ID (204) | Ad Format (206) | Ad Content (208) | Geography (210) | Overall Conversion Rate (212) | Overall Click-Through Rate (214) | Keyword Bids (216) | Taxonomy Bids (218, 220) |
|---|---|---|---|---|---|---|---|---|
| ADV12345 (Tire Shop) | ADT98765 (Truck Tires) | Streaming Video | Dramatic | Toldeo, OH | 5% | 13% | "Truck"=$X "Tire"=$Y | "Truck parts"=$Z |
| | ADT98765 (Tractor Tires) | Plain Text | Professional | Midwest | 8% | 18% | "Truck"=$X "Tire"=$Y | "Truck parts"=$Z |
| | ADT98765 (SUV Tires) | Text/Picture | Humor, Family Friendly | Southern CA | 3% | 10% | "Truck"=$X "Tire"=$Y | "Truck parts"=$Z |
| ADV12345 (Florist) | ADT98765 (Spring Sale) | Text/Picture | Family Friendly | | 2% | 5% | "Flowers"=$X | "Flowers"=$Z |

Aggregation Service — 114

- Aggregation Engine (224)
- External Communication Module (226)

ADVERTISING DATABASE SYSTEM AND METHOD

CROSS-REFERENCE TO RELATED APPLICATIONS

The present application claims priority as available under 35 U.S.C. §§ 119-121 to the following U.S. Patent Application (which is incorporated by reference in the present Application): U.S. Provisional Patent Application No. 60/645,346 entitled "Endorsement Based Keyword Advertising" filed on Jan. 19, 2005.

BACKGROUND

A common advertising model utilized on the Internet, in particular with search engine websites, involves a system of providing sponsored links. Sponsored links are paid advertisements that appear in addition to search results when users input keywords at search engine websites. For example, if a user enters the term "flowers," advertisements that an advertiser believes may be relevant to someone searching for flowers are displayed with particular search results. The advertisements appear as a result of advertisers bidding on particular keywords, such as "flowers." If multiple advertisers place bids on the same keyword, it is common for advertisements with the highest bids to be displayed when a user enters a search term that matches the keyword. Oftentimes, there is no limit on the number of search terms a particular advertiser may bid on.

The bidding process is commonly managed by an intermediary, such as a search engine website. Advertisers bid on keywords and submit advertisements associated with the keywords to the intermediary. The intermediary typically utilizes one or more databases for storing the advertisements, associating the advertisements with bids and keywords, keeping track of the highest bidders, scheduling, etc., and ensuring that at any given instance the advertisements corresponding to the highest bids are displayed when search terms matching the keywords are entered by the users. Whenever a user clicks on a displayed advertisement, the intermediary charges the advertiser a fee. The intermediary also commonly monitors the "click-through" rate (e.g., how many users actually select or click on the displayed advertisement). In some cases, if the number of users clicking on the advertisement is too low, the advertisement will no longer be displayed, even if it is associated with the highest bid.

Another variation of the above-described concept is to show the keyword-based advertisements on websites other than search engines' search result sites. For example, if a website contains information about flowers, then it is likely that people viewing the website may have an interest in advertisements related to flowers. Thus, the intermediary may provide special programs to which publishers of websites can subscribe. In such a program, the intermediary analyzes the publisher's website to determine a suitable keyword or set of keywords to be associated with the website, such as "flowers" in the above example. The intermediary selects from its database the highest bidder on the determined keyword or keywords and provides the appropriate advertisements for the publisher's website. This type of advertising program is beneficial to the publisher, since the publisher is not required to take action other than display the advertisements and collect monetary compensation for displaying the advertisements. The publisher may also receive monetary compensation each time a viewer of the website clicks on the displayed advertisement. This compensation model is often referred to as "pay per click." Alternatively, the publisher can be compensated based on the sales of the product featured in the advertisement, such as a certain percentage of the sales revenues of the featured product, rather than based on the number of clicks on the displayed advertisement. This compensation model is often referred to as "pay based on conversion."

It would be advantageous to provide a system and method that enables publishers to use keyword based advertising arrangements and at the same time to control advertisements that are placed on their websites. It would also be advantageous to provide a system and method that enables web users and publishers to endorse various advertisements, advertisers and/or products referenced in particular advertisements. It would further be advantageous to provide a system and method that enables aggregation of advertisement related data including the endorsements of advertisements and/or advertisers by web users, publishers and advertisers. It should be understood that, although certain advantages are described, the teachings herein may be used to implement systems and methods that do not have any of these advantages but which have other advantages.

SUMMARY

One embodiment relates to a method of accessing an advertisement database. The method comprises selecting an advertisement from the advertisement database, providing the selected advertisement for publication with a web page, and selecting an endorsement for the advertisement from the advertisement database. The endorsement is made by an entity other than the advertiser with whom the advertisement is associated. The advertisement and the endorsement are published together when the web page is published to a visitor.

Another embodiment relates to an advertisement database service for on-line advertising. The advertisement database service is configured to receive advertisements from advertisers. Each advertisement has an associated bid indicative of a remuneration that an advertiser associated with the advertisement will compensate a website publisher for a specified response to the associated advertisement. The advertisement database service is further configured to aggregate the received advertisements in an on-line advertisement database that is accessible to website publishers via the Internet, receive advertisement selection information from a publisher of a website, select an advertisement from the advertisement database in accordance with the selection information, and provide the advertisement to the website publisher for display on the website of the website publisher.

Another embodiment relates to a method of accessing an advertisement database having a plurality of advertisements stored therein. The method comprises providing an advertisement database service which includes the advertisement database and which is accessible to website publishers. The method further comprises receiving advertisement selection information from a publisher of a website, selecting an advertisement from the advertisement database in accordance with the selection information, and providing the advertisement to the website publisher for display on the website of the publisher.

BRIEF DESCRIPTION OF DRAWINGS

FIG. 2 is a schematic view of an advertisement service in the system of FIG. 1;

DETAILED DESCRIPTION OF THE EMBODIMENTS

Figure 1:
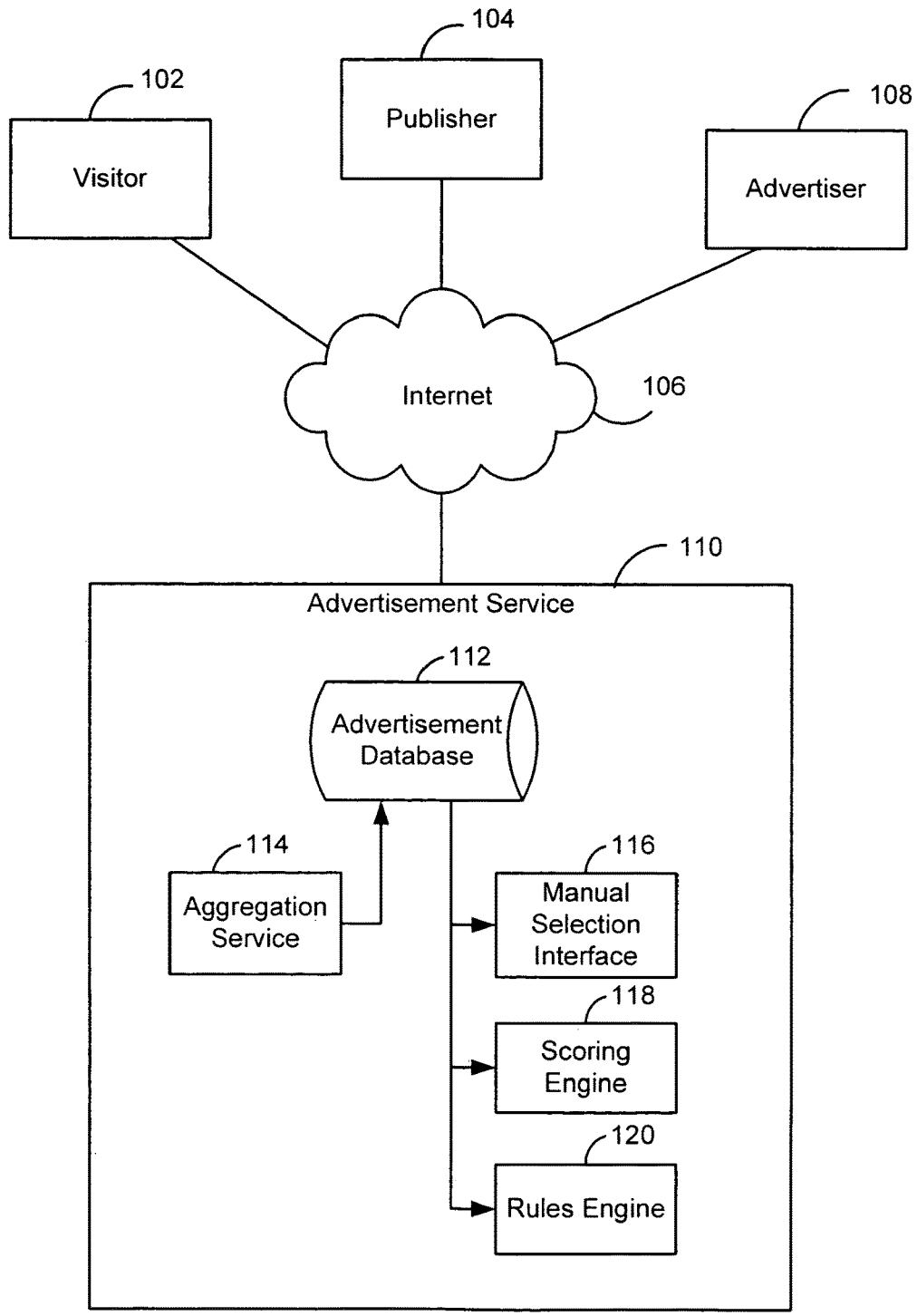
FIG. 1 is a schematic view of an advertising system according to an exemplary embodiment.

Referring now to FIG. 1, a system 100 according to an exemplary embodiment is shown. System 100 comprises one or more website visitors 102, one or more website publishers 104, one or more website advertisers 108, and an advertisement database service 110. Visitors 102, publishers 104, advertisers 108 and advertisement service 110 may each comprise one or more computers which are connected to each other by way of network 106, such as the Internet. Visitors 102 are able to view websites made available by a number of publishers 104 through network 106. Advertisers 108 may offer for sale products or services by advertising on the websites of publishers 104. Advertisement service 110 includes an advertisement database 112, an aggregation service 114, a manual selection interface 116, an advertisement scoring engine 118, and advertisement rules logic 120. Advertisement service 110 may be used to facilitate the selection and/or endorsement of advertisements to be placed on websites.

As described in greater detail below, in an exemplary embodiment, system 100 provides website publishers 104 the ability to review and select available web advertisements for placement on corresponding websites. For example, advertisers 108 may supply on-line advertisements associated with a particular keyword or keywords. The publishers 104 then make their own decisions about which advertisements to put on their web pages. Publishers 104 may, for example, base their advertisement placement decisions on their own experience with the products or services featured in the advertisements, on their experience with the manufacturers of the products or providers of the services, or on other factors, such as recommendations from persons or entities they trust. In an exemplary embodiment, a database 112 of advertisements from different advertisers may be maintained by advertisement service 110 along with bid amounts that indicate a maximum that each advertiser 108 is prepared to pay in response to a visitor 102 clicking on or otherwise selecting the advertisement from a web page where the advertisement is published. In this embodiment, publishers 104 may be given access to all the advertisements and associated bids in the database 112 and may select which advertisements to put on their web pages using the service 110.

In another exemplary embodiment, the publishers 104 may add endorsements of advertisements on their web pages. For example, a publisher 104 may offer its own name and reputation in support of (or, in appropriate circumstances, in opposition to or in disavowal of) the representations made in the advertisements and the reputations of the advertisers who supply the advertisements. For example, a publisher 104 can include its own testimony about the products, services, or other items featured in the advertisements, or user reviews of same. Likewise, a publisher 104 can include its own assessment as to the credibility, trustworthiness, or other qualities of the various advertisers. A publisher 104 can even endorse an advertisement for the sake of the advertisement itself, irrespective of what that advertisement is trying to sell or who placed it, as for example where the advertisement is particularly eye-catching, humorous, or thought-provoking, or where the advertisement is one prepared by a particular advertising agency whose characteristic style is likely to appeal to the publisher's target audience. Endorsements from publishers 104 may also be syndicated such that an endorsement of an advertisement may be published on any website that publishes a given advertisement, not just the website of the publisher 104 making the endorsement. The endorsements may also be made by other users. For example, visitors 102 may also be provided with the ability to endorse advertisements. In an exemplary embodiment, aggregation service 114 may be used to aggregate and store the endorsements with the advertisements in the database 112. Providing the ability to endorse advertisements extends the notion of "celebrity endorsement" to everyday visitors 102 and publishers 104 of websites.

Referring now to FIG. 2, the advertisement service 110 is shown in greater detail. In FIG. 2, table 200 is shown which represents information which may be stored in the advertisement database 112. The database 112 may store information concerning multiple advertisers 108 and for multiple advertisements for each of the advertisers 108. For example, the advertisement database 112 may contain hundreds or thousands of advertisements or more. Column 202 lists different advertisers and column 204 lists different advertisements for each of the different advertisers. In FIG. 2, an advertiser ID and advertisement ID are shown as being stored for each advertiser and advertisement, respectively. It will be appreciated that additional information may also be stored. For example, for each advertiser ID, additional information concerning the advertiser may be stored (e.g., complete name, contact information, electronic billing codes or addresses, and so on). Likewise, for each advertisement ID, additional information concerning the advertisement may be stored, such as a datafile containing the advertisement associated with the advertisement ID, a product ID or product category to which the advertisement relates, the manufacturer of the advertised product, a retailer(s) that is selling the advertised product, the advertising agency that created the advertisement, and so on. The advertisement service 110 may define identification systems (e.g., alpha-numeric numbering systems or conventions) to maintain consistency across all publishers 104 and all advertisers 108 with regard to advertiser IDs, advertisement IDs, product IDs, product categories, manufacturer IDs, retailer IDs, and/or any other information that is maintained. Such identification systems may be created and maintained as part of the creation and maintenance of the database 112. In an alternative embodiment, the advertisement service may adopt existing identification systems to the extent such identification systems already exist.

Some of the additional information that is stored for each advertisement is shown in column 206, which includes a plurality of sub-columns 208-220. As will be described in greater detail below, the information stored in column 206 may be used as selection criteria for selecting advertisements. The selection based on the data in column 206 may, for example, be performed in manual fashion using selection interface 116 and/or in automated or semi-automated fashion using advertisement scoring engine 118 and/or advertisement rules logic 120.

In column 208, for each advertisement, the format of the advertisement is identified (e.g., streaming video, text, combined text and picture, and so on). The publisher 104 may want to select advertisements having a particular format, for example, depending on the amount of space to be dedicated to a particular advertisement, the overall look and feel of the publisher's website, and so on. In column 210, the content of the advertisement is identified. In an exemplary embodiment, a predetermined number of categories may be defined, and an advertisement may be designated by the advertiser 108 or another entity as fitting into any one or more of the predefined categories. For example, as shown, an advertisement may be designated as being humorous and family friendly.

In column 212, geographic information for the advertisement is stored. The geographic information in column 212 may be used to ensure that advertisements are selected for a visitor 102 which are relevant to the visitor 102 based on the known or assumed location of the visitor 102. For example, it would normally not be useful for a website that targets a Texas audience to publish an advertisement for a tire shop located in Toledo, Ohio. Alternatively, the actual address information for the visitor 102 may be known (e.g., because address information was obtained from the visitor 102 when the visitor 102 registered to use the website of the publisher 104 or when the visitor registered to use system 100, because address information of the visitor 102 has been determined based on the IP address of the visitor 102, etc.). Again, in this instance, if it is known that the address of the visitor 102 is in Texas, then displaying an advertisement for a tire shop in Toledo, Ohio to the visitor 102 would normally not be productive. As will be appreciated, the geographic information in column 212 may be stored in a variety of forms (e.g., one or more zip codes, city/state information, metropolitan statistical areas, and so on).

In columns 214 and 216, performance metrics for the advertisements may be stored. For example, the overall conversion rate (column 214) and the overall click-through rate (column 216) may be maintained. The performance metrics may be obtained and updated based on feedback provided by the publishers 104.

In columns 218 and 220, bid information may be stored. Advertisers 108 may be permitted to provide bids based on keywords (column 218). As another example, rather than using keywords, the advertiser 108 may designate the advertisement as belonging to one or more categories of a taxonomy of advertisement database 112 and provide a bid for each taxonomy (column 220).

Figure 3:
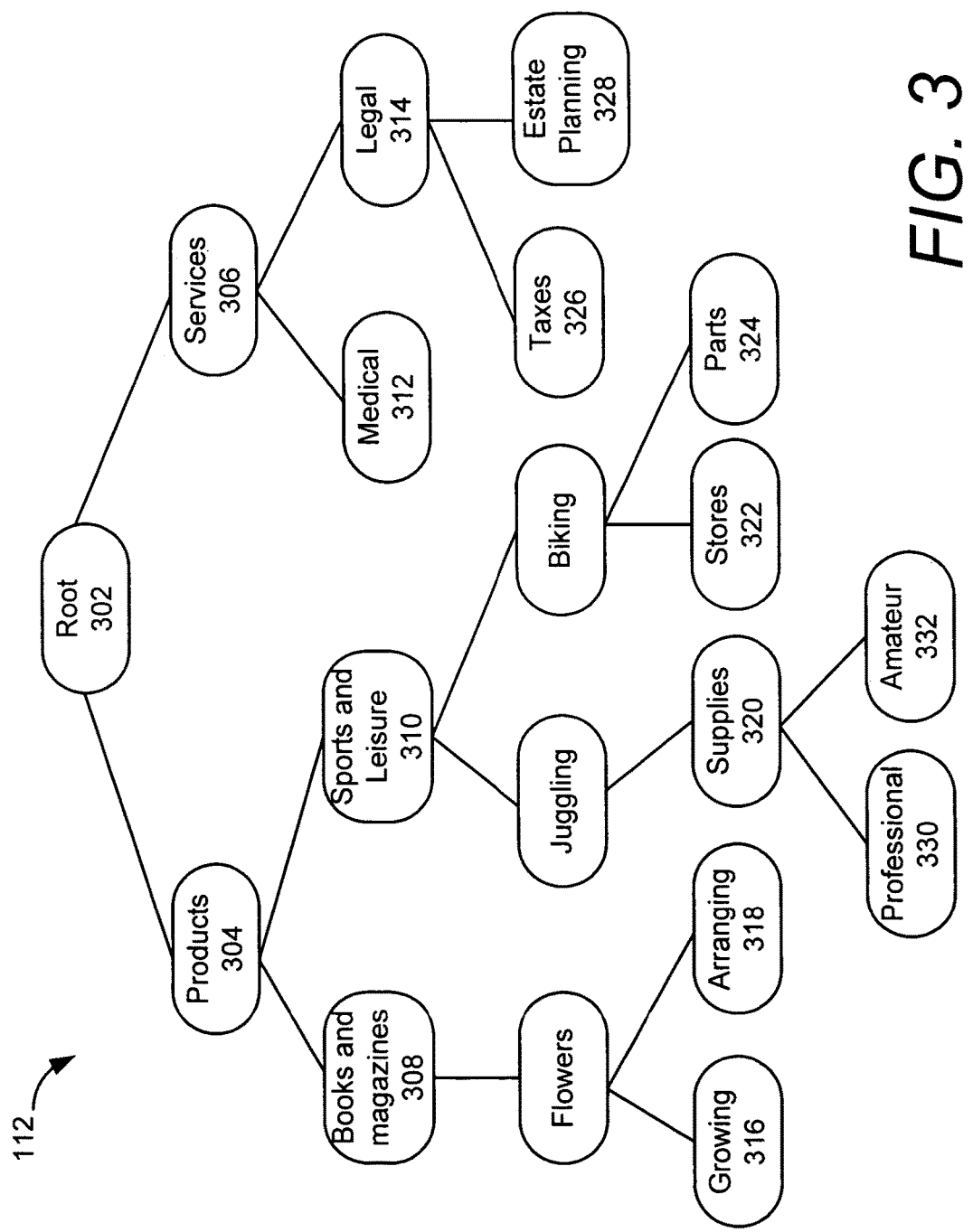
FIG. 3 is a schematic view of a taxonomy of the advertisement database of FIG. 1 from which publishers can select advertisements for their websites according to an exemplary embodiment.

Referring now also to FIG. 3, FIG. 3 shows an example of a taxonomy that may be used to categorize advertisements in connection with receiving bids in column 220. As shown in FIG. 3, the advertisements may be arranged in a hierarchical tree model, based on the topics or keywords to which they relate. A root node 302 forms the base of the hierarchical tree. Under the root node 302, there are two subcategories for advertisements, "Products" 304 and "Services" 306. Each of these categories contain further subcategories, such as "Books and Magazines" 308, "Sport and Leisure" 310, "Medical services" 312 and "Legal services" 314, which in turn have their own subcategories, until a final desired granularity has been reached in which the advertisements can be placed. In the example shown in FIG. 3, the advertisements stored in the lowest level of granularity would relate to "Books and Magazines about growing flowers" 316, "Books and Magazines about arranging flowers" 318, "Juggling supplies for professionals" 330, "Juggling supplies for amateurs" 332, "Bike Stores" 322, "Bike parts" 324, "Legal Services for Taxes" 326, and "Legal Services for Estate Planning" 328. In an exemplary embodiment, the taxonomy is created and maintained by the advertisement service 110 pursuant to the creation and maintenance of the advertisement database 112. As will be appreciated, many other taxonomies can be implemented that may provide for easy and efficient searches. A more detailed example of a taxonomy arrangement is disclosed in U.S. Ser. No. 11/223,809, filed Sep. 9, 2005, "Server System and Methods for Matching Listings to Web Pages and Users," hereby incorporated by reference. Advertisers 108 may designate advertisements as belonging to one or more of the above taxonomy categories and publishers 104 may search for and select advertisements falling within one or more of the taxonomy categories.

The bid amounts stored in columns 218 and 220 reflect how much advertiser 108 is willing to pay each time its advertisement is clicked on or otherwise selected by visitors who encounter the advertisement on a publisher's website. In an exemplary embodiment, multiple bids may be contained within each bid category. For example, advertisers can bid not only on keywords but also on particular publishers. As another example, advertiser 108 may provide more than one per-click bid. For example, the advertiser 108 may provide a first bid indicating how much advertiser 108 will compensate a publisher 104 that places an advertisement on its website, and may provide a second bid indicating how much advertiser 108 will compensate another user that provides an endorsement in association with the advertisement in addition to displaying the advertisement (e.g., compensation to another publisher 104, in the case of a syndicated endorsement). According to another exemplary embodiment, rather than provide a per-click bid, the advertiser 108 may pay a fixed fee to advertisement service 110 to place its advertisement in a particular category of the taxonomy for a particular time period. This fee may vary, for example, depending on the popularity of the category or the type of items that are advertised within a particular category. For example, it may be more expensive for advertiser 108 to make an advertisement available in a general "Sports and Leisure" category than in a more specialized "Bicycle Parts" category. Likewise, it may be more expensive to place an advertisement in a "Best Sellers" category than in an "Advanced Quantum Physics books" category, due to the likely lower number of visitors, and thereby website publishers, that will select an advertisement from the latter category. Ad selection based on the bids and other information stored in the database 112 is described in greater detail below in connection with FIG. 5.

Also shown in FIG. 2 is aggregation service 114 which includes an aggregation engine 224 and a communication module 226. Aggregation engine 224 and communication module 226 are used to collect information to populate and maintain database 112. In general, aggregation engine 224 collects and stores specific data related to the advertisements and users that are part of advertisement service 110. Aggregation engine 224 may prompt users to provide such information (e.g., either manually or via automated service requests). Additionally, or alternatively, computers of publishers 104 and advertisers 108 may be programmed to generate, and aggregation engine 224 may be programmed to receive, batch transfers of such information. For example, aggregation engine 224 may receive feedback information from publishers 104, such as information relating to performance metrics (e.g., conversion rates), information relating to a popularity ranking of the advertisement within its advertisement subcategory within the taxonomy of FIG. 3, a ranking among publishers 104 or subgroups of publishers, a ranking among visitors 102 or particular groups of visitors, and so on. Aggregation engine 224 may receive advertisements and related information from advertisers 108. Aggregation engine 224 may also be used to aggregate endorsement information, as described below. Any such information that is collected may be stored in database 112. The aggregation engine 224 may also be used to access the database 112 to provide advertisements, endorsements, and other information to the users 102, 104, and 108 based on selections made using selection interface 116, scoring engine 118 and/or rules logic 120. External communication module 226 manages communications with the entities 102, 104, and 108 of the system 100 in collecting such information.

Figure 4:
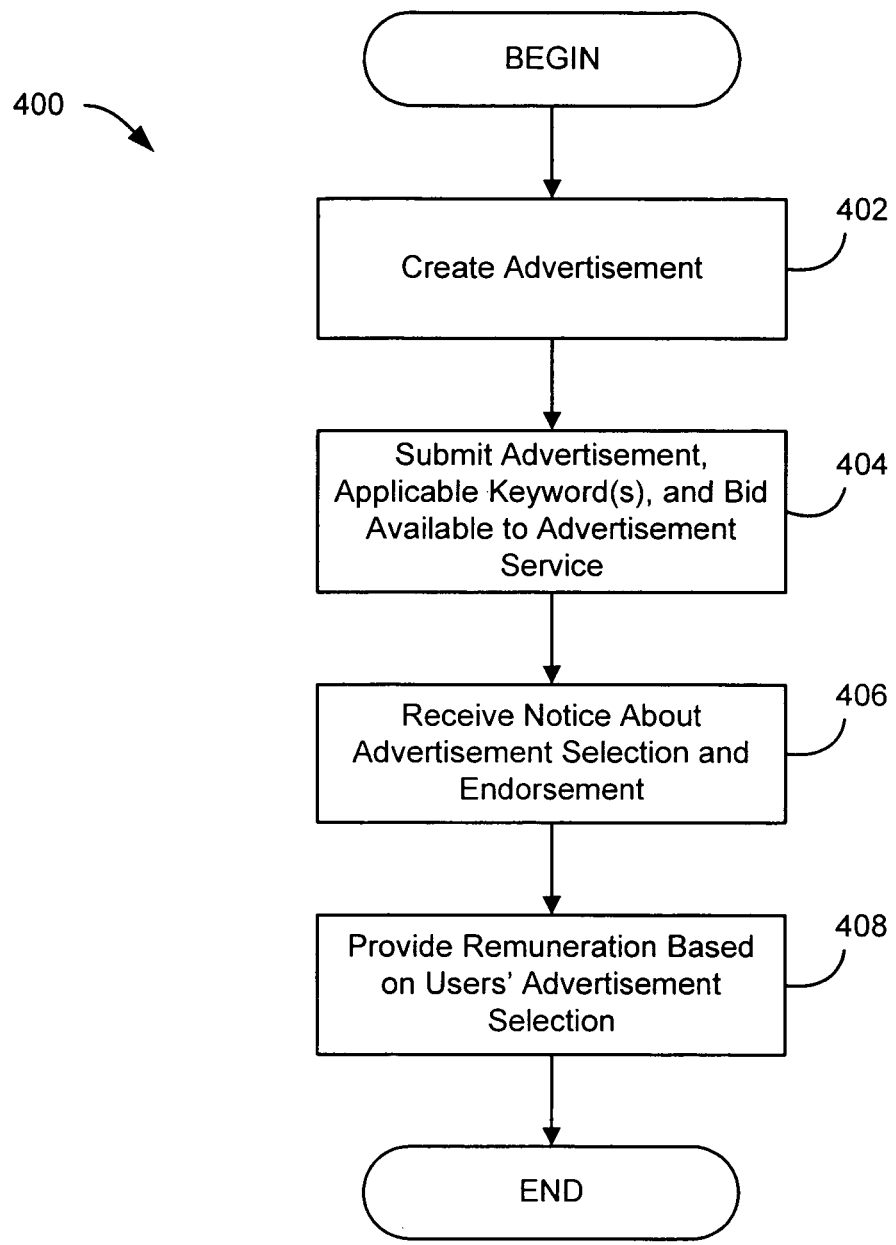
FIG. 4 is a flowchart showing how advertisers make advertisements available to publishers according to an exemplary embodiment.
Figure 5:
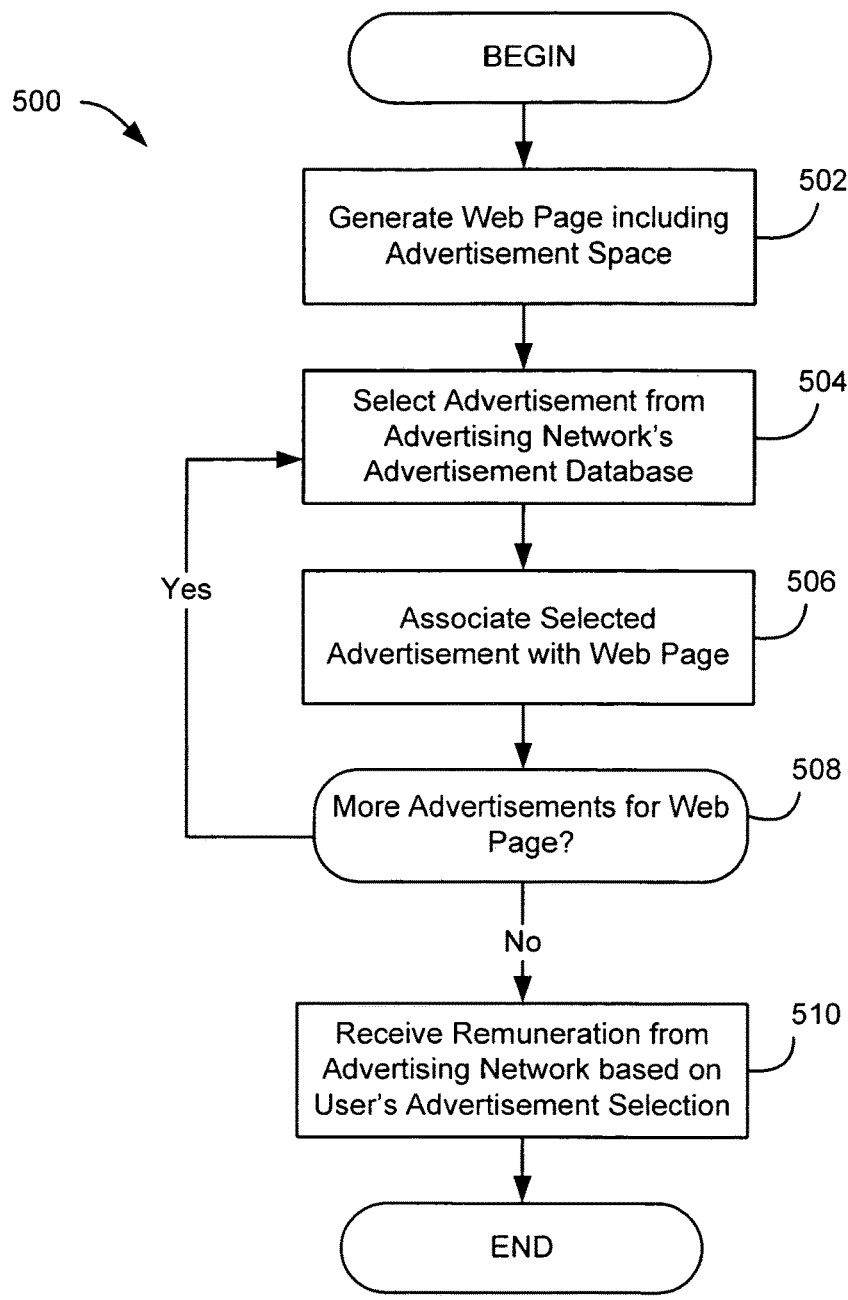
FIG. 5 is a flowchart showing how publishers select advertisements to be displayed on the publishers' websites according to an exemplary embodiment.

Referring now to FIGS. 4-5, FIGS. 4-5 are flowcharts illustrating processes by which advertisers and publishers, respectively, may use the system 100 of FIG. 1. Referring first to FIG. 4, FIG. 4 is a flowchart illustrating a process 400 by which advertisers 108 may use the system 100. At step 402, an advertiser 108 creates one or more advertisements that the advertiser 108 would like to make available to the publishers 104. The advertisements may be stored in electronic format (such as text files, image files, etc.) so that they can be submitted to advertisement service 110 over network 106.

At step 404, the advertisement is then submitted to the advertisement service 110 wherein it is ultimately made available to the publishers 104. For example, each advertisement may be submitted as a data file to advertisement service 110 using network 106. The data file is then associated with the advertisement ID in column 204. When submitting the advertisement, other information needed to complete database 112 may be included by the advertiser 108, such as the format of the advertisement (column 208), the content of the advertisement (column 210), geographic information (column 212), and bid information for the advertisement (columns 218 and 220). Once the advertisement has been placed in the database 112, the advertisement is available for selection by publishers 104.

Advertisers 108 may also be provided with the ability to update the information in the database 112. For example, if an advertiser is running a campaign for product X which comprises a series of three advertisements, the datafile for the advertisement may be updated to include the new advertisement (e.g., a new streaming video data file, or a new text/picture datafile). This allows the publishers 104 to publish each of the three advertisements in the ad campaign series without the publisher 104 having to update any selections. This arrangement may also be used in situations where publisher 104 is primarily interested in promoting a specific advertiser rather than promoting specific individual products or services.

When the advertisement has been selected by the publisher 104, that is, by making it available to visitors 102 through the publisher's web page, the advertiser 108 may be notified of the selection, at step 406. According to an exemplary embodiment, upon submitting the advertisement to advertisement service 110, advertiser 108 can specify that it does not wish to be notified when the advertisement is selected by a publisher 104, in which case step 206 is not performed.

Whenever a visitor 102 selects the advertiser's advertisement on a publisher's website, advertiser 108 is charged a fee by advertisement service 110 and, in response, provides remuneration to the advertisement service (step 408). Although the remuneration may be calculated on a click-by-click basis, for example, remuneration may be provided on a daily, weekly, or monthly payment basis to advertisement service 110, depending upon the billing arrangements that have been made between advertisement service 110 (or publisher) and advertiser 108. It will be appreciated that, in addition to providing compensation in monetary form, the compensation may also be provided in other forms (such as points, rewards, barter, setoffs, and so on).

FIG. 5 is a flowchart showing a process 500 by which a publisher 104 may use system 100 of FIG. 1. At step 502, a web page is generated which includes space for one or more advertisements that will be selected from and supplied by the advertisement database 112. The web pages may be generated manually or automatically. For example, if the web pages are generated automatically, a template may be used which contains fields, to be populated with various information (e.g., a field to be populated with a news story or other content of interest to a visitor, along with additional fields to be populated with advertisements).

At step 504, the advertisement database 112 is accessed through network 106 and a selection is made of an advertisement to be displayed on the publisher's website. In an exemplary embodiment, the selection is manually performed by the publisher 104 using manual selection interface 116. Manual selection of advertisements may, for example, be used in connection with static web pages. For example, the manual selection interface 116 may comprise a website made available to the publishers 104 to allow the publishers 104 to access the database 112. When a publisher 104 wants to select an advertisement to be shown on its web page, the publisher 104 visits the website of the advertisement service 110 and navigates its advertisement database 112 to identify advertisements that it would like to publish on its web page. The navigation may be performed by browsing, that is, the publisher 104 may be permitted to select and view the contents of different advertisement categories. For example, the publisher may be allowed to drill down on various categories of the taxonomy shown in FIG. 3. The navigation may also be performed by searching, that is, the publisher may be permitted to type in one or more keywords and obtain a list of advertisements associated with the keywords. The advertisement information may, for example, be presented to the publisher in tabular format, such as in a format similar to that shown in FIG. 2. The publisher may then click on various items in the table to obtain additional information (e.g., click on the advertisement ID to see a copy of the advertisement, click on the bid amount to obtain additional details concerning the bid, and so on).

In another exemplary embodiment, the selection is performed automatically. Automatic selection of advertisements may, for example, be used in connection with web pages that are dynamically generated. For example, advertisement scoring engine 118 may be used to implement a scoring algorithm which generates a score for each advertisement in the database 112 based on similarity of the advertisement with other advertisements selected by the publisher 104. The scoring algorithm may, for example, take into account any of the parameters identified in columns 208-220 in FIG. 2. For example, if the publisher 104 typically selects humorous advertisements from within a particular preferred taxonomy, then advertisements which are designated as being humorous and which are classified within the publisher's preferred taxonomy would score higher than other advertisements in the database 112. Historical data may be maintained regarding previous manual selections of advertisements made by the publisher 104. Alternatively, in order to have a well-defined sample set of advertisements, the publisher 104 may be permitted to maintain a first "approved" library of advertisements which it believes fit the image of its website and a second "disapproved" library of advertisements which it believes do not fit the image of its website. The scoring of other advertisements may then be performed based on the similarity of the other advertisements to the advertisements in the approved library and the dissimilarity of the other advertisements to the advertisements in the disapproved library.

As will be appreciated, the scoring algorithm may be based on any of a variety of mathematical models. For example, a logit model may be used having the form $$\text{Ad\_Score}_n = \frac{e^{X_n \beta}}{1 + e^{X_n \beta}}$$

(where X is a vector comprising a set of explanatory variables (e.g., data obtained from the 208-220 for one of the advertisements, which may be either numeric or categorical values), $\beta$ is a vector comprising a set of weighting coefficients for the explanatory variables, and $\text{Ad\_Score}_n$ is the score assigned to a particular one of the advertisements under consideration). A regression algorithm may be used to determine an optimal set of weighting coefficients. For example, the regression algorithm may take the values for the advertisements in the approved and disapproved libraries as inputs and generate a set of weighting coefficients which optimally predicts the probability whether an advertisement under consideration would be approved or disapproved by the publisher. Those advertisements with the highest probability of being approved are then selected for publication by the publisher 104.

In another embodiment, rather than the selection being entirely automatic, the scoring algorithm is used to generate suggested advertisements, e.g., to facilitate the manual selection of advertisements for static web pages. The publisher 104 may then view the advertisement and decide whether or not to accept the suggestion. The scoring algorithm may adjust weighting coefficients based on feedback from the publisher (that is, whether the suggestions of the scoring algorithm are accepted or rejected). For example, for a group of suggested advertisements, some of which are accepted and some of which are rejected, the weighting coefficients of the scoring algorithm may be re-optimized based on feedback. The next time suggestions are made to the publisher 104, the updated scoring algorithm may be used and further updates may be made.

The scoring algorithm may also be adjusted in a manner which tries to match the overall composition of the advertisements in the library (e.g., a certain percentage of humorous advertisements, a certain percentage of professional advertisements, certain percentage of advertisements from different taxonomies, and so on). For example, if 25% of the advertisements in the library are designated as humorous, and 30% of the advertisements selected within a predetermined preceding time period (e.g., the previous week) have been humorous, then the weight given to humor in the scoring algorithm may be decreased (i.e., such that being humorous does not help an advertisement's score as much as it would under normal circumstances).

As another example, a rules logic 120 may be implemented which stores business rules for selecting advertisements. The rules logic 120 may be used to facilitate manual selection of advertisements for static web pages or for automatic selection of advertisements for dynamically generated web pages. The rules logic 120 may be made accessible to publishers 104 via a website of the advertisement service 110 so that the publishers 104 may program business rules into the rules logic 120. For example, a publisher 104 may decide only to publish advertisements where the bid per click is above a certain threshold value. As another example, a website for a boating club may decide to publish any advertisement which is designated as being within a boating equipment taxonomy, so long as the click-through rate and the bid-per-click value are above predetermined threshold values. As another example, another publisher 104 may decide that only advertisements which are designated as being family-friendly may be published on its website. As another example, a publisher 104 may decide to publish any advertisements that are made available by a particular advertiser. The rules logic 120 may store rules to implement such business decisions. Advertisements may then be selected that meet the parameters defined in the rules logic 120. To the extent that more advertisements meet the defined parameters than can be published on the website, further selection may be performed randomly, under the direction of the advertisement service 110, or in another manner. Alternatively, the advertisements that fit within the parameters defined in the rules logic 120 may be presented to the publisher 104 as suggested advertisements, and the publisher 104 may manually review the suggested advertisements to arrive at a set of advertisements to be published on its website.

As another example, publishers 104 may be placed into cohorts. For example, a daily newspaper in one city may be placed in the same cohort as a daily newspaper in another city. Advertisements may then be selected for one member of a cohort based on selections made by other members of the same cohort.

As will be appreciated, the above advertisement selection techniques may be used apart from or in combination with a keyword bidding system. For example, in the context of the taxonomy arrangement described above, the publisher 104 may select advertisements for a static web page using the taxonomy of FIG. 3, without the use of keywords. Likewise, the scoring algorithm may be used to select advertisements for dynamically generated web pages based on parameters other than keywords, or by using the keywords only to ensure relevancy of the selected advertisements (without looking at the amount of the keyword bid when selecting the advertisement). The publisher 104 may then be compensated, for example, on a per click basis (e.g., each time a visitor 102 clicks on an advertisement, the advertiser pays whatever per click bid the advertiser associated with the advertisement in the advertisement database 112). On the other hand, if the above advertisement selection techniques are used in combination with a keyword bidding system, then the above advertisement selection techniques may (for example) be used to perform an initial filtering of advertisements, followed by an ultimate selection of an advertisement based on a keyword bid. For example, if one-hundred advertisers have bid on a particular keyword, the rules logic 120 may be used to narrow the list of potential candidate advertisements to twenty-five (e.g., the twenty-five advertisements meeting predetermined criteria as set forth in the business rules). Of the remaining twenty-five advertisements, the advertisement with the highest bid (or other parameter, e.g., revenue-generating potential, depending on the advertisement selection algorithm used) may be selected.

In another exemplary embodiment, the aggregation service 114 may include blocking logic that permits advertisers 108 to block selection of their advertisements by publishers 104. For example, an advertiser 108 may wish to opt out of being published on the web pages of a certain publisher on the basis that the advertisements of the advertiser 108 have low relevancy to the web pages of the publisher 104, on the basis that the marketing image of the publisher 104 is not consistent with the marketing image of the advertiser 108, or for another reason.

At step 506, the selected advertisement is associated with the web page. As a result, whenever the web page is viewed, the correct advertisement is retrieved from the advertisement database 112 and is displayed to the visitor 102.

Although in the embodiment of FIG. 5 the advertisement is shown as being selected after the web page is generated, it may be noted that the advertisement may also be selected before the web page is generated. That is, a publisher 104 may select various advertisements in advance. When a particular web page is generated, one of the pre-selected advertisements may be published with the web page. For example, a publisher 104 may select a group of advertisements (or a group of advertisers, etc.) to randomly alternate on the publisher's website.

At step 508, it is determined whether any further advertisements should be selected. If publisher 104 desires to select more advertisements from the advertisement database, the process returns to step 504 and repeats steps 504-508, as described above, until no more advertisements are to be selected. Whenever a visitor 102 views a publisher's website and clicks on an advertisement, publisher 104 receives remuneration from advertisement service 110 (step 510). The remuneration may, for example, be a percentage of what advertisement service 110 charges advertiser 108, a fixed fee, a compensation based on the advertiser's sales revenues for the product featured in the advertisement, or any other suitable compensation arrangement agreed upon by publisher 104 and advertisement service 110.

Figure 6:
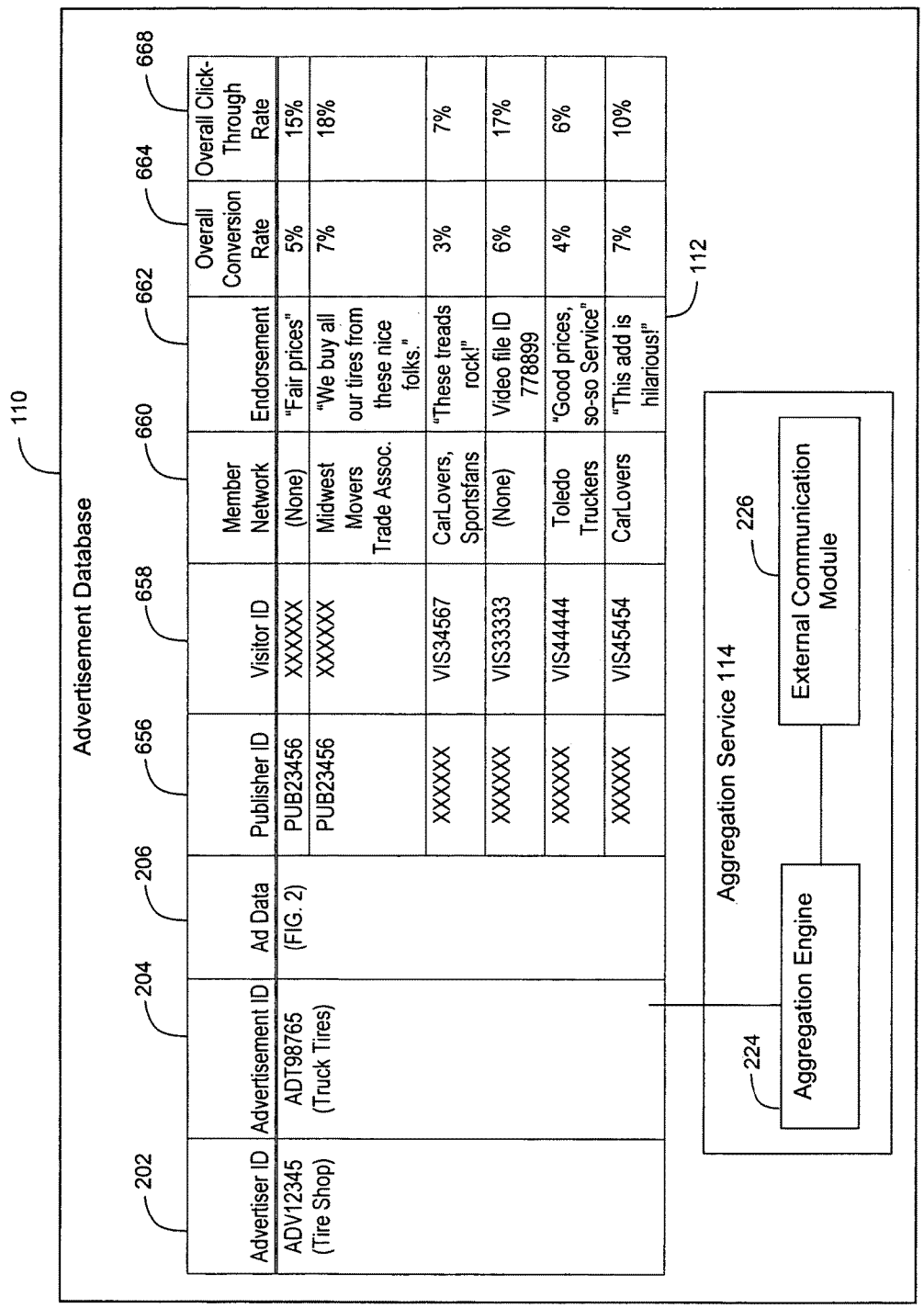
FIG. 6 is a schematic view showing additional information stored in a database of the advertisement service of FIG. 2.

Referring now to FIG. 6, users (e.g., visitors 102, publishers 104) may also be provided with the ability to endorse advertisements, and the endorsements may be published with the advertisements when the advertisements are published. This allows reputations to be attached to products or services, particular advertisers, particular advertisements or advertising agencies, etc., based on who endorses them. The aggregation can be done in a personalized manner to match an individual visitor 102 with products or services that are endorsed by publishers or by other visitors 102 that the individual visitor likes. An aggregation service can allow a particular visitor 102 to view recommendations by a group of people, such as his friends, people in his neighborhood, or other people that he trusts, who are part of a network of people (social network) to which the visitor 102 belongs. For example, the social network may be created and maintained by the advertisement service 110 pursuant to the creation and maintenance of the advertisement database 112. As another example, the social network may be an existing social network created and maintained by a third party. In such an embodiment, of course, membership information for the social network would need to be obtained by the advertisement service 110 from the third party, e.g., by way of the Internet. A feedback mechanism may be implemented in the aggregation service, so that a visitor 102 can select to view recommendations from only a subset of trusted friends among all the people in his network. Using this feedback mechanism, a visitor 102 can ignore recommendations and endorsements from persons or entities that he or she does not know or does not trust. This allows virtually anybody to endorse a product. Consumers are likely to find such personal endorsements more useful than traditional celebrity endorsements in many instances, for example, in connection with advertisements for services, since not very many people among the general public are likely to use the same gardener, doctor, auto mechanic, and so on as a particular celebrity.

As shown in FIG. 6, a number of additional columns 656-668 of information may be added to the advertisement database as compared to what is shown in FIG. 2. For each advertisement, information may be stored for each endorsement that is made. In FIG. 6, the additional information is shown as being in a separate row for each endorsement; accordingly, a number of rows of data are added for each advertisement. Each row of data includes information about an endorsement made by another user, such as a publisher 104 or a visitor 102. In column 656 and 658, a publisher ID or visitor ID is stored, respectively, for a publisher 104 or visitor 102 associated with a particular endorsement. In column 660, a member network of the endorser is stored. In column 662, the endorsement is stored. It may be noted that the endorsement may take a variety of different forms. For example, the endorsement may be a simple text endorsement. As another example, the publisher 104 or visitor 102 may submit a file containing an audio-visual endorsement (e.g., an endorsement made by a visitor 102 using a webcam). Endorsements from publishers 104 may be received by way of selection interface 116 when the advertisement is selected or at other times. Endorsements from visitors 102 may be received when the advertisement is displayed to the visitor 102. That is, the visitor 102 may be given the option to provide feedback to the advertisement service 110 (e.g., by clicking on a link near the advertisement, and then typing in a text endorsement and/or recording an audio-visual endorsement with a webcam). Other mechanisms for obtaining endorsements from users are described below in connection with FIG. 8. Visitors 102 and publishers 104 may endorse specific advertisements (e.g., based on advertisement ID), specific advertisers (e.g., based on advertiser ID), specific manufacturers (e.g., based on manufacturer ID), specific retailers (e.g., based on retailer ID), specific products (e.g., based on product ID), specific product categories (e.g., based on product category ID), and so on, depending on what information is maintained for advertisements in database 112 as described above in connection with FIG. 2. In columns 664 and 668, performance metrics for the endorsement may be stored.

Endorsements for advertisements may then be selected in generally the same manner as described above in connection with the advertisements themselves. For example, once an advertisement is selected as described above in connection with FIG. 5, one or more endorsements for the advertisement may be selected based on matching selection criteria. That is, an advertisement may be associated with a specific advertiser, specific manufacturer, specific retailer, specific product, specific product category, and so on, as described above. A search may be made of the database 112 for endorsements that are associated with the advertisement itself or with the same manufacturer, product or other criteria. One or more matching endorsements may then be selected for the advertisement.

For example, for static web pages, a publisher may access manual selection interface 116 to select endorsements based on matching selection criteria. As another example, for dynamically generated web pages, business rules may be stored in rules logic 120 for selecting advertisements. For example, a publisher 104 may decide that, if a visitor 102 is a member of a member network, a search for endorsements will first be made to locate any endorsements by other members of the same member network. If any such endorsements exist, that endorsement will be published. If no such endorsements exist, then another endorsement may be selected based on other rules stored in rules logic 120. As will be appreciated, other information may be stored for each endorsement and used as selection criteria in selecting advertisements. For example, the address of the endorser may be stored to allow endorsements to be selected based on whether the endorser is from the same geographic area (e.g., as opposed to the same member network) as the visitor 102. A publisher 104 may also store a business rule which always causes any endorsements made by the publisher itself to be published with the advertisement, if any such endorsements exist for the advertisement under consideration. As another example, endorsements may be selected based on performance metrics. For example, the performance of an endorsement may be tracked (e.g., whether displaying the endorsement next to an advertisements results in an increased likelihood of the visitor 102 clicking on the advertisement). An endorsement selection algorithm may then be implemented which selects endorsements based on past performance (e.g., with better performing endorsements being selected more often). New endorsements may be tested during a trial period, or the endorsement selection algorithm may be configured to cycle through all advertisements so that all endorsements receive at least a minimum number of impressions.

In the examples described above, both the advertisement and the endorsement are selected by the publisher 104 using tools provided the advertisement service 110. As will be appreciated, however, either the advertisement or the endorsement or both may be selected by the advertisement service 110.

Figure 7:
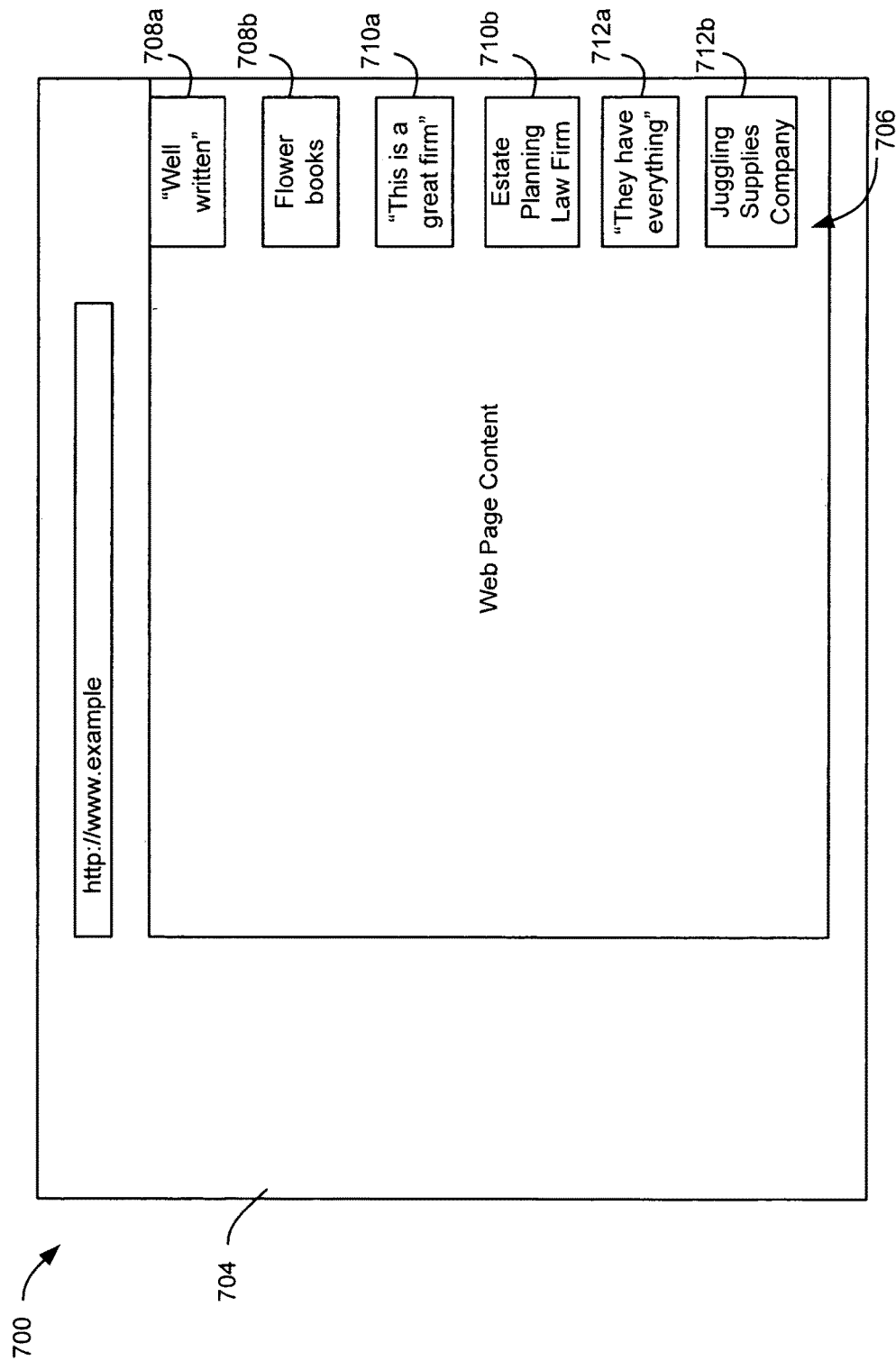
FIG. 7 is a screenshot showing an exemplary website with advertisements and their associated endorsements by the publisher of the website according to an exemplary embodiment.

Referring now to FIG. 7, FIG. 7 provides an example of a publisher's web page as displayed in an individual's web browser. As can be seen in FIG. 7, the web page is downloaded in the visitor's browser in a conventional manner by typing in the address of the web page in an address field of the web browser. The web page contains an information section 704 with the information that is provided by publisher 104. On the right hand side of the web page, there is an advertising section 706 that contains three advertisements that publisher 104 has selected from the taxonomy of advertisement database 112 of advertisement service 110.

In the example shown in FIG. 7, first advertisement 708*b* relates to flower books and was selected from the subcategory "Flowers" of the "Books and Magazines" category 308 in FIG. 3. The second advertisement 710*b* relates to estate planning law and was selected from the subcategory "Estate Planning" 328 in FIG. 3. The third advertisement 712*b* relates to juggling supplies and was selected from the subcategory "Supplies" 320 in FIG. 3. Each advertisement has an associated endorsement 708*a*, 710*a*, 712*a* added by publisher 104. Advertisements can be placed anywhere on the web page. In FIG. 7, the advertising section is shown by way of example as being placed on the right hand side. In another exemplary embodiment, a visitor 102 may be provided with a link that may be clicked on to be presented with multiple endorsements, such as all endorsements for an advertisement, all endorsements for an advertisement meeting predetermined selection criteria (e.g., all endorsements from other members of the social network of the visitor 102, all endorsements meeting other endorsement selection criteria as described above in connection with FIG. 6), and so on.

Publishers' endorsements increase the likelihood that visitors 102 who trust the publishers will click on the advertisements with which the endorsements are associated. Thus, advertisers whose advertisements are endorsed by publishers get attention from more visitors 102. The result is that the advertisers' sales are increased, the publishers receive more revenues, and the visitors 102 are more likely to have their expectations fulfilled when clicking on a particular advertisement, both in the "pay per click" compensation model and in the "pay based on conversion" compensation model. Since the publishers put their own reputations at stake through their endorsements, the publishers are motivated to recommend high quality or good value products, thereby enhancing the customer experience for visitors 102 that click on advertisements bearing the publishers' endorsements. Thus, overly positive or overly negative endorsements are discouraged and the interests of all the participants in the advertising model are aligned in the same way. Publishers are likely to make honest recommendations, since they will receive more revenues if more people trust them, and the trust is built by making balanced comments that are both positive and negative.

In another exemplary embodiment, as indicated above, endorsements of publishers 104 may be syndicated and placed on websites of other publishers 104. For example, certain publishers 104 may be willing to offer a "seal of approval" type of endorsement for the products or services being advertised in a particular advertisement. In such a situation; a portion of the per-click fee (or other fee) charged to the advertiser 108 may be used to compensate the endorsing publisher 104 for the endorsement. The advertiser 108 may be charged a premium in the per-click fee to cover the cost of the endorsement, and the premium to be paid may be taken into account in the advertisement and endorsement selection process described above.

In another exemplary embodiment, as indicated above, endorsements may be made by a visitor 102 that is not a publisher 104 (e.g., as in the case of an individual endorsing an advertisement to friends in the individual's social network). In such a situation, the system 100 provides a mechanism which allows the individual to voice an opinion on the advertisement, and compensation for the endorsement is not necessary. In another exemplary embodiment, such individuals may also be provided compensation for making such endorsements.

Figure 8:
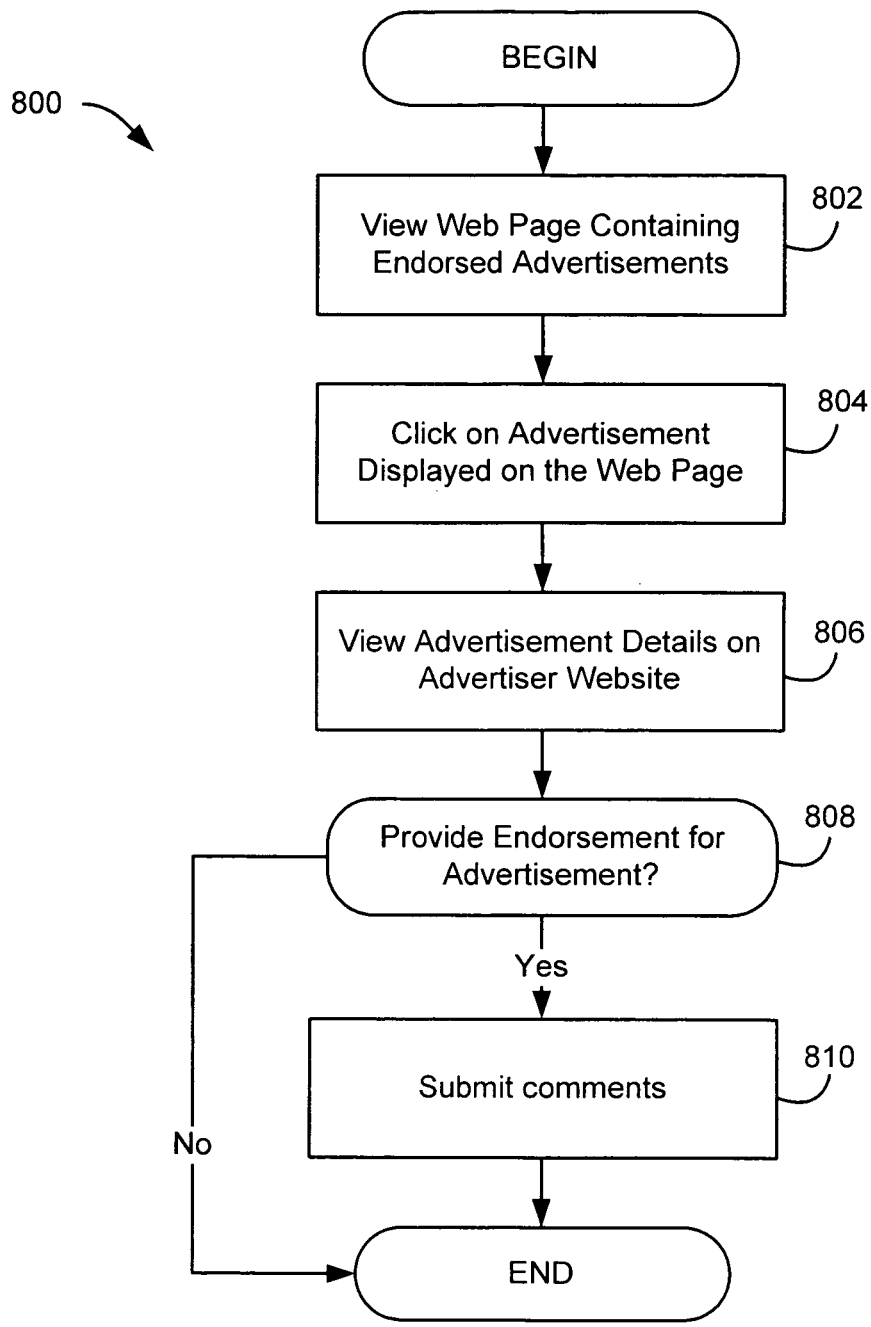
FIG. 8 is a flowchart showing how visitors select advertisements and provide endorsements.

FIG. 8 is a flowchart of a process 800 for how a visitor 102 interacts with the system 100 in providing an endorsement with regard to an advertisement. The process 800 starts with a visitor 102 viewing a web page made available by a publisher 104, which contains endorsed advertisements (step 802). The visitor 102 selects one of the advertisements that are displayed on the web page (step 804), for example, by clicking on the advertisement with a computer mouse, which may result in a new browser window opening up with the advertiser's website or a different website featuring the product or service described in the selected advertisement (step 806). In addition, information relating to the advertisement's endorsements may be displayed to the visitor 102.

The visitor 102 may be provided with the ability to provide an endorsement regarding the selected advertisement (step 808). If the visitor chooses not to provide an endorsement, the process ends. If the user chooses to provide an endorsement, the process goes on to step 810 where the user submits comments to the advertisement service 110. An endorsement from the visitor 102 may be obtained, for example, by providing a link on the web page on which the advertisement is presented which the visitor 102 to click on to provide an endorsement. In another exemplary embodiment, the visitor 102 may be provided with access to an endorsement website that is operated by the advertisement service 110 and that is configured to receive visitor endorsements. For example, the advertisement ID (or another unique identification number) may be displayed to the visitor 102 and may be used by the visitor 102 to associate an endorsement with a particular advertisement on the visitor endorsement website. Alternatively, or in addition, the visitor 102 may be provided with the ability to search advertisements on the visitor endorsement website and to provide an endorsement once a particular advertisement is located (e.g., where the user makes the decision to provide an endorsement some time after originally viewing the advertisement). In another exemplary embodiment, the link to the website of the advertiser 108 may be provided in a frame, and the visitor 102 may be provided with the ability to click on another portion of the publisher's web page outside of the frame to provide the endorsement. Once it is received, the user's endorsement may be stored and presented to other visitors 102 who wish to know not only what the publishers 104 think, but also what other visitors 102 among the general population of users or within their social network think about the product or service that is featured in the selected advertisement.

Figure 9:
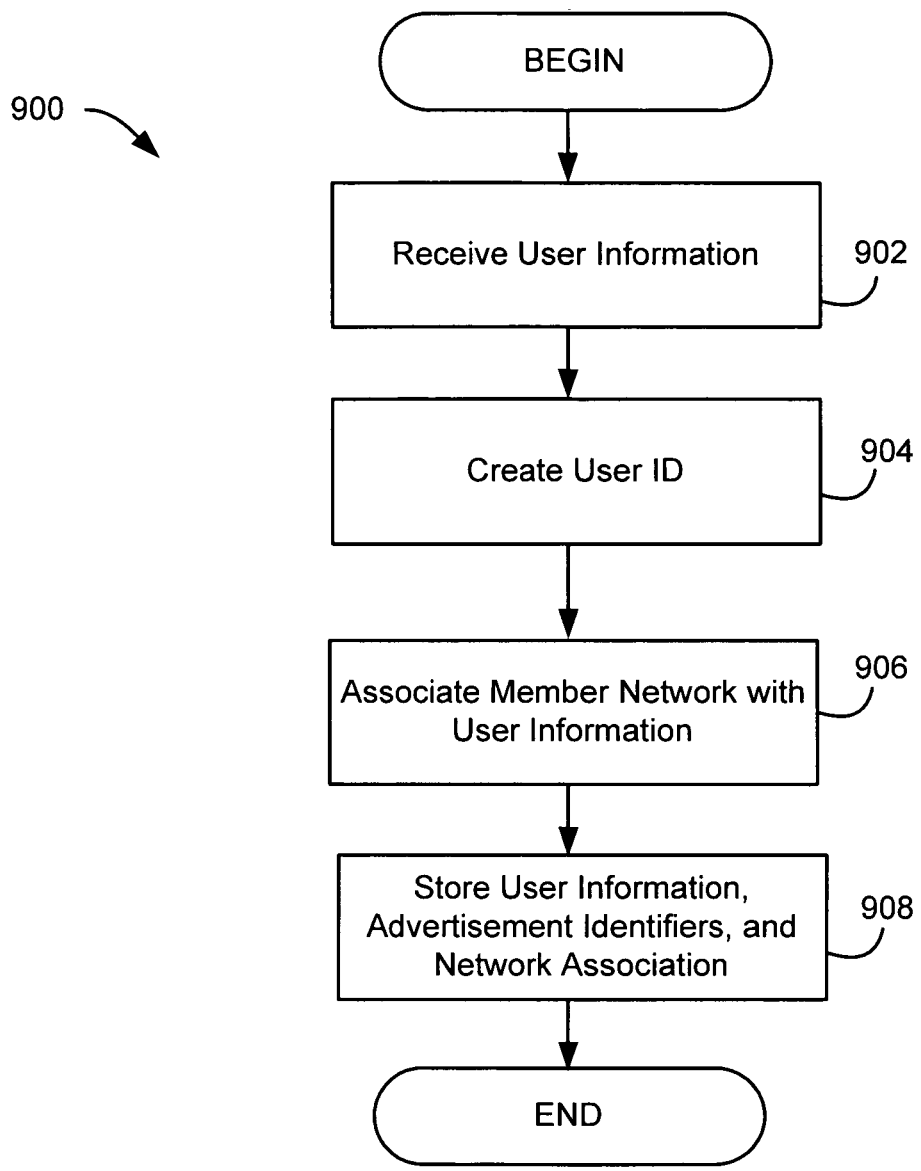
FIG. 9 is a flowchart showing a registration process.

FIG. 9 is a flowchart showing a process 900 for how the aggregation service 114 registers users such as advertisers 108, publishers 104 and/or visitors 102 of the system 100. The process 900 starts with the aggregation engine 224 receiving information identifying a user through the external communication module 226 (step 902). The aggregation engine 224 then assigns a unique User ID to the received user information (step 904). Any social network associations submitted by the user are associated with the assigned User ID (step 906), such that specialized endorsement information of the kind discussed above can be retrieved at a later point in time. Finally, the process stores all the user information, any associated advertisement identifiers, and any network associations in the database 112 (step 908), which completes the process.

It may be noted that, although visitors 102 may register with the system 100 using the process shown in FIG. 9, the system 100 may also be used in connection with visitors 102 that are not registered. For example, other processes may be used to obtain user-specific information for the visitor 102 and/or the system 100 may operate without such information.

Figure 10:
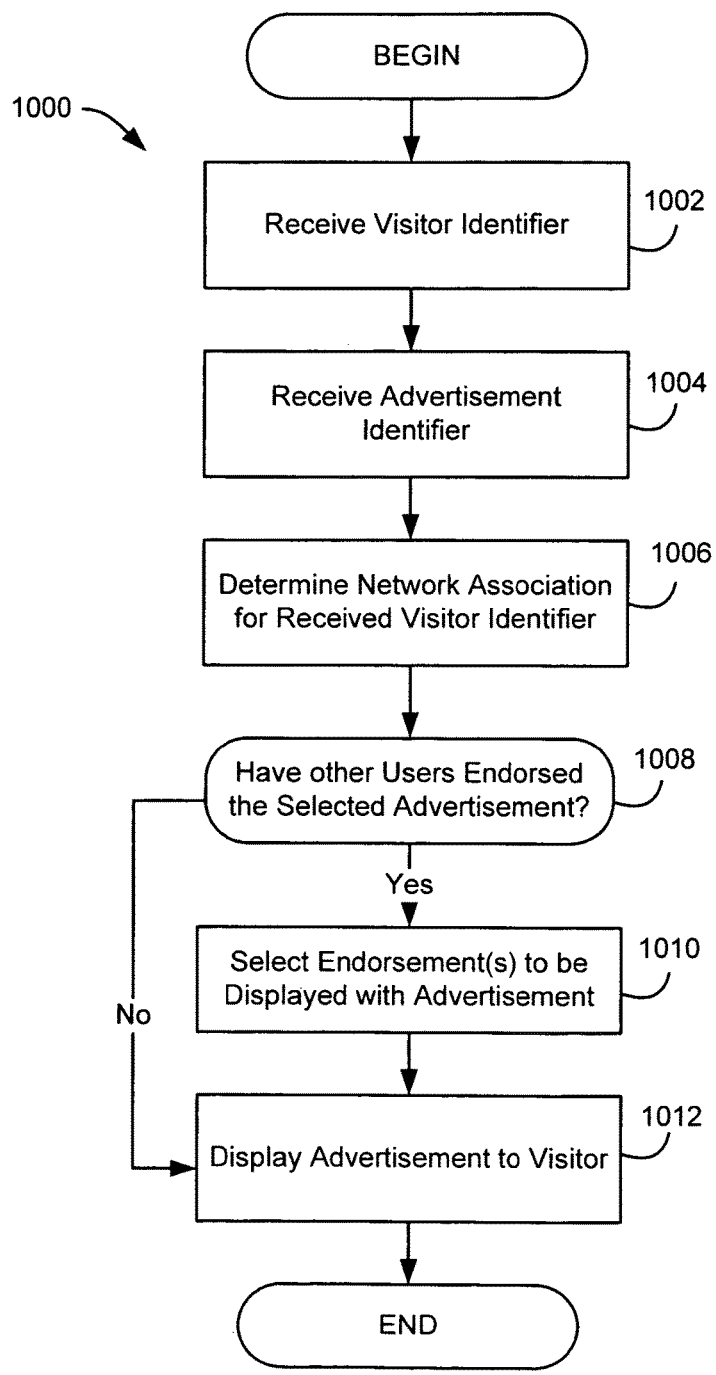
FIG. 10 is a flowchart showing operations that are performed by the aggregation service of FIG. 1 when a user selects an advertisement on a publisher's web page.

FIG. 10 is a flowchart showing a process 1000 for operations of the aggregation service 114 when a visitor 102 clicks on an advertisement on a publisher's web page and is provided with endorsements from other users. As a result of a visitor 102 selecting an advertisement, the aggregation service 114 receives user identifying information, such as an IP (Internet Protocol) address, that can be correlated with a particular User ID in the database 112 (step 1002). The aggregation service 114 also receives an advertisement identifier for the selected advertisement (step 1004). Based upon the received user identifier, the aggregation service searches the database 112 to determine whether the visitor 102 that selected the advertisement belongs to any registered social networks (step 1006).

The aggregation engine 224 then determines, based on the Ad ID and the information stored in the database 112, whether any other publishers 104 or visitors 102 have provided an endorsement, as described above (step 1008). If no visitors or publishers have provided an endorsement, the process skips to step 1012 and presents the advertisement to the visitor 102. However, if other users have endorsed the advertisement, the process selects one or more endorsements to be displayed to the visitor 102 as described above (step 1010) before presenting the final displayed advertisement to the user in step 1012, which ends the process.

In another exemplary embodiment, the network 106 is a digital television network, and the visitors 102 receive advertisements from the publishers 104 using televisions. For example, the publishers 104 may be cable television providers or hotel providers. Advertisements and endorsements may be customized for visitors based on information obtained for the visitors when registering for cable TV service or during room registration.

Here and throughout, terms such as "user," "advertiser," "publisher," "visitor," and so forth are to be understood in the broadest possible sense. Herein, the term "user" is used generically to refer to advertisers, publishers, and visitors. By way of illustration and not of limitation, an "advertiser" may be an individual or a commercial, government, or non-profit entity; may be directly responsible for placing an advertisement, announcement, message, or the like, or may be a broker, reseller, or intermediary for another's advertisements, announcements, messages, or the like; may be advertising for its own products and services or may be advertising on behalf of another; may be represented by a human agent or by a web service, software agent, or other programmatic construct; etc. Likewise, a "publisher" is not restricted to persons or entities who purport to be in the on-line publishing business (or any other kind of publishing business), nor to entities who have complete or even primary control over the content of particular websites; but rather is used in a more general sense, and includes, for example, any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a website and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end consumer of a product or service that is the subject of an advertisement; etc. In sum, persons of skill in the art will appreciate that a wide variety of actors, more than can be conveniently set forth here, can play the roles of "advertiser," "publisher," and "visitor" for purposes of the present invention. It will be further appreciated that the self-same person or entity may be both "publisher" and "advertiser," or both "publisher" and "visitor," or both "advertiser" and "visitor", or even all three, depending on the context. In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of accessing an advertisement database that stores multiple advertisements and multiple endorsements, the computer-implemented method comprising:

under control of one or more computer systems configured with executable instructions, receiving, from a website publisher, at least one selection of an advertiser entity, the advertiser entity providing at least one advertisement for selection and display on a website of the website publisher;

receiving, from the website publisher, a rule to apply to advertisements in the advertisement database, wherein the rule is generated by the website publisher and comprises a minimum criterion for an advertisement;

automatically selecting, based at least in part on the rule, a first advertisement from the advertisement database, the first advertisement to be displayed on the website of the website publisher and the first advertisement being associated with the advertiser entity;

providing the first advertisement for publication with a web page on the website published by the web site publisher, wherein the web site publisher publishes the web page to a visitor;

receiving a second advertisement from the advertiser entity, wherein the second advertisement is received based at least in part on the at least one selection of the advertiser entity;

receiving a plurality of endorsements associated with the first advertisement or the second advertisement, the plurality of endorsements supplementing the first advertisement or the second advertisement;

determining a performance metric associated with an endorsement of the plurality of endorsements, the performance metric based at least in part on at least one of:

an increased likelihood of selection of the first advertisement based at least in part on the endorsement being displayed near the first advertisement; or an increased likelihood of selection of the second advertisement based at least in part on the endorsement being displayed near the second advertisement;

selecting, from the advertisement database, the endorsement of the plurality endorsements based at least in part on the performance metric associated with the endorsement; and providing the endorsement and the first advertisement or the second advertisement to be published together on the webpage.

2. The method of claim 1, wherein the method further comprises storing information in the advertisement database concerning the endorsement, including information concerning a user that made the endorsement; and wherein the endorsement is selected based on a comparison of the information concerning the user that made the endorsement and the visitor of the web page to whom the endorsement is to be displayed.

3. The method of claim 2, wherein:

the visitor is a first visitor, the user that made the endorsement is a second visitor, the second visitor having previously viewed the first advertisement, and selecting the endorsement further comprises determining that the first visitor and the second visitor are members of a common social network.

4. The method of claim 2, wherein:

the visitor is a first visitor, the user that made the endorsement is a second visitor, the second visitor having previously viewed the first advertisement, and selecting the endorsement further comprises determining that the first visitor and the second visitor are from similar geographic locations.

5. The method of claim 1, further comprising utilizing an aggregation service to:

store advertisement identifying information;

store user identifying information;

store endorsement information;

store keywords associated with particular advertisements and advertisers; and store member network information.

6. One or more computer-readable devices storing computer-executable instructions that, when executed on one or more processors, configure the one or more processors to:

receive advertisements from advertisers, individual advertisements having an associated bid indicative of a remuneration provided to a website publisher from an advertiser associated with the individual advertisements based at least in part on a specified response to the individual advertisement;

aggregate the advertisements in an advertisement database that is accessible to website publishers via a network;

receive advertisement selection information from a publisher of a website, wherein the advertisement selection information includes one or more of an advertisement format, geographic information, one or more advertisement performance metrics, or a bid taxonomy;

store the selection information;

select an advertisement from the advertisement database in accordance with the selection information and a score for the advertisement in the advertisement database, the score being generated based at least in part on similarity in taxonomy of the advertisement to other ads selected by the publisher of the website;

receive a plurality of endorsements associated with the advertisement, the plurality of endorsements supplementing the advertisement;

determining a performance metric associated with an endorsement of the plurality of endorsements, the performance metric being based at least in part on an increased likelihood of selection of the advertisement based at least in part on the endorsement being displayed near the advertisement;

select, based at least in part on the performance metric, the endorsement of the plurality of endorsements; and cause the endorsement to be displayed with the advertisement on the website of the web site publisher.

7. The one or more computer-readable devices of claim 6, further storing computer-executable instructions that, when executed by the one or more processors, configure the one or more processors to:
   receive an indication that a visitor selects the advertisement on the website; and
   control a flow of the remuneration between the advertiser and the publisher of the website based on the indication.

8. The one or more computer-readable devices of claim 6, further storing computer-executable instructions that, when executed by the one or more processors, configure the one or more processors to collect and store advertisement related data including:
   advertisement identifying information;
   user identifying information;
   endorsement information;
   keywords associated with particular advertisements and advertisers; and
   member network information.

9. The one or more computer-readable devices of claim 8, further storing computer-executable instructions that, when executed by the one or more processors, configure the one or more processors to enable publishers to navigate the advertisement database and review the advertisement related data.

10. The one or more computer-readable devices of claim 6, further storing computer-executable instructions that, when executed by the one or more processors, configure the one or more processors to store rules provided by the website publishers for selection of advertisements from the advertisement database.

11. A computer-implemented method comprising:
   under control of one or more computer systems configured with executable instructions,
   providing an advertisement database service including an advertisement database having a plurality of advertisements stored therein, the advertisement database service being accessible to website publishers;
   receiving a plurality of endorsements, the plurality of endorsements supplementing the plurality of advertisements;
   storing, in the advertisement database, the endorsements and information concerning the endorsements, including information concerning entities that made the endorsements;
   receiving advertisement selection information from a publisher of a web site,
   determining, based at least in part on the advertisement selection information, a score for at least one advertisement of the plurality of advertisements with a scoring engine comprising a scoring algorithm;
   selecting an advertisement of the plurality of advertisements from the advertisement database based at least in part on the score generated by the scoring engine;
   determining a performance metric associated with an endorsement of the plurality of endorsements, the performance metric being based at least in part on an increased likelihood of selection of the advertisement based at least min part on the endorsement being displayed near the advertisement;
   selecting, based at least in part on the plurality of performance metrics, the endorsement; and
   causing the advertisement and the endorsement to be displayed on the website of the publisher to an entity other than an entity that made the endorsement.

12. The method of claim 11, further comprising:
   receiving a group of advertisements from advertisers, each individual advertisement of the group of advertisements having at least one associated keyword and an associated bid indicative of a remuneration that an advertiser associated with the individual advertisement is to compensate a website publisher for a specified response to the individual advertisement; and
   organizing the group of advertisements in the advertisement database according to a predetermined hierarchy, and wherein:
   the advertisement database is accessible to the website publishers, the website publishers being provided with the ability to navigate the plurality of advertisements in the advertisement database; and
   the advertisement selection information is manual selection information received from the publisher as the publisher navigates the plurality of advertisements in the advertisement database.

13. The method of claim 11, wherein the advertisement selection information is received in the form of advertisement selection rules programmed by the publisher into a rules logic, and wherein the advertisement is selected at least in part by the rules logic in accordance with the advertisement selection rules.

14. The method of claim 13, wherein the one or more advertisements selected by the rules logic are presented to the publisher for review, and the advertisement is also selected based on inputs received from the publisher during the review of the one or more advertisements selected by the rules logic.

15. The method of claim 11, wherein the advertisement database comprises advertisement entries, each advertisement entry comprising:
   an indication of an individual advertisement;
   bid information indicative of a remuneration that an advertiser associated with the individual advertisement is to compensate a website publisher for a specified response to the individual advertisement; and
   one or more keywords associated with the individual advertisement, the keywords being words provided by the advertiser as terms that the advertiser associates with the plurality of advertisements.

16. The method of claim 11, further comprising providing advertisement recommendations to the website publishers based on at least one of:
   a keyword associated with content of a website on which at least one advertisement is to appear;
   historical data related to advertisement selections of a website publisher; and
   information matching the website publisher with a particular group of users based on information in the advertisement database.

17. The method of claim 11, wherein selecting the endorsement is further based on a comparison of the information concerning the entity that made the endorsement and a visitor of the website to whom the endorsement is to be displayed, the method further comprising:
   delivering the endorsement with the advertisement.

18. The one or more computer-readable devices of claim 6, further storing computer-executable instructions that, when executed by the one or more processors, configure the one or more processors to perform an operation comprising maintaining the endorsement in the advertisement database.

19. The method of claim 1, wherein the visitor of the web page includes the entity other than the entity that made the endorsement.

20. The one or more computer-readable devices of claim 6, wherein the endorsement and the advertisement are displayed on the website to a plurality of entities including an additional entity other than an entity that made the endorsement.

21. The method of claim 1, further comprising:
implementing a scoring algorithm by using selection information as an input to the scoring algorithm; and
using output of the scoring algorithm to select the advertisement from the advertisement database.

22. The method of claim 11, wherein the scoring algorithm accepts input including:
a first vector of the advertisement selection information; and
a second vector comprising a set of weighting coefficients for the advertisement selection information.

* * * * *

UNITED STATES PATENT AND TRADEMARK OFFICE
CERTIFICATE OF CORRECTION

PATENT NO. : 10,482,474 B1
APPLICATION NO. : 11/330754
DATED : November 19, 2019
INVENTOR(S) : Udi Manber et al.

It is certified that error appears in the above-identified patent and that said Letters Patent is hereby corrected as shown below:

In the Claims

Column 21, Line 61, change "based at least min part on the endorsement being" to -- based at least in part on the endorsement being --.

Signed and Sealed this
Thirty-first Day of December, 2019

Andrei Iancu
*Director of the United States Patent and Trademark Office*